United States Patent [19]

Enari

[11] Patent Number: 5,847,840
[45] Date of Patent: Dec. 8, 1998

[54] IMAGE TRANSMITTING APPARATUS

[75] Inventor: Masahiko Enari, Yokohama, Japan

[73] Assignee: Canon Kabushiki Kaisha, Tokyo, Japan

[21] Appl. No.: 683,763

[22] Filed: Jul. 17, 1996

Related U.S. Application Data

[62] Division of Ser. No. 962,722, Oct. 19, 1992, Pat. No. 5,565,992.

[30] Foreign Application Priority Data

Oct. 21, 1991 [JP] Japan .................................. 3-272700

[51] Int. Cl.⁶ ..................................................... H04N 1/00
[52] U.S. Cl. ........................................... 358/409; 358/433
[58] Field of Search ..................... 381/23, 29; 358/261.1, 358/261.2, 261.3, 427, 433, 409; 371/37.1; 348/512, 420, 423; 382/246, 238, 239

[56] References Cited

U.S. PATENT DOCUMENTS

| | | | |
|---|---|---|---|
| 4,494,144 | 1/1985 | Brown | 358/133 |
| 4,982,282 | 1/1991 | Saito et al. | 358/133 |
| 5,070,503 | 12/1991 | Shikakura | 371/37.1 |
| 5,446,744 | 8/1995 | Nagasawa | 371/37.4 |
| 5,481,412 | 1/1996 | Bannai | 360/18 |
| 5,565,992 | 10/1996 | Enari | 358/261.3 |

FOREIGN PATENT DOCUMENTS

| | | |
|---|---|---|
| 497545 | 8/1992 | European Pat. Off. . |
| 501699 | 9/1992 | European Pat. Off. . |
| 3602825 | 8/1987 | Germany . |
| WO91/10329 | 7/1991 | WIPO . |

OTHER PUBLICATIONS

Patent Abstracts of Japan, vol. 14, No. 414 (E–0975), Sep. 7, 1990 & JP–A–02 159 186 (Seiko Epson Corp.) Jun. 19, 1990.

Patent Abstracts of Japan, vol. 15, No. 148 (E–1056), Apr. 15, 1991 & JP–A–03 024 887 (Sony Corp.), Feb. 1, 1991.

IEEE Transactions On Consumer Electronics, vol. 37, No. 3, Aug. 1, 1991, pp. 275–282, XP263196, M. Yoneda et al. "An Experimental Digital VCR With New DCT–Based Bit–Rate Reduction System".

IEEE Transactions On Consumer Electronics, vol. 35, No. 3, Aug. 1, 1989, pp. 450–457, XP6569, C. Yamamitsu et al. "An Experimental Study for a Home–Use Digital VTR".

J. Inst. Television Engineers Japan, vol. 44, No. 2, Feb. 1990, pp. 153–161.

*Primary Examiner*—Thomas D. Lee
*Assistant Examiner*—Jerome Grant, II
*Attorney, Agent, or Firm*—Fitzpatrick, Cella, Harpor & Scinto

[57] ABSTRACT

There is provided an image transmitting method whereby each picture plane is divided into a plurality of regions, a variable-length coding is executed to image information on a region unit basis, and the variable-length coded image information to be compressed is transmitted together with information other than the image information on a data block unit basis of a predetermined data amount, wherein boundary information indicative of the position in the data block of the boundary between the image information to be compressed of each of the divided regions is arranged in a predetermined portion of each of the data blocks, the resultant data blocks are transmitted, specific data which can be distinguished from the boundary information is included in the predetermined portion of each of the data blocks, the information other than the image information is given in place of the image information to the data blocks including the specific data, and the resultant data blocks are transmitted. Further, an image transmitting method for giving the information other than the image information to the predetermined portions including the specific data and transmitting the resultant data blocks is provided.

14 Claims, 11 Drawing Sheets

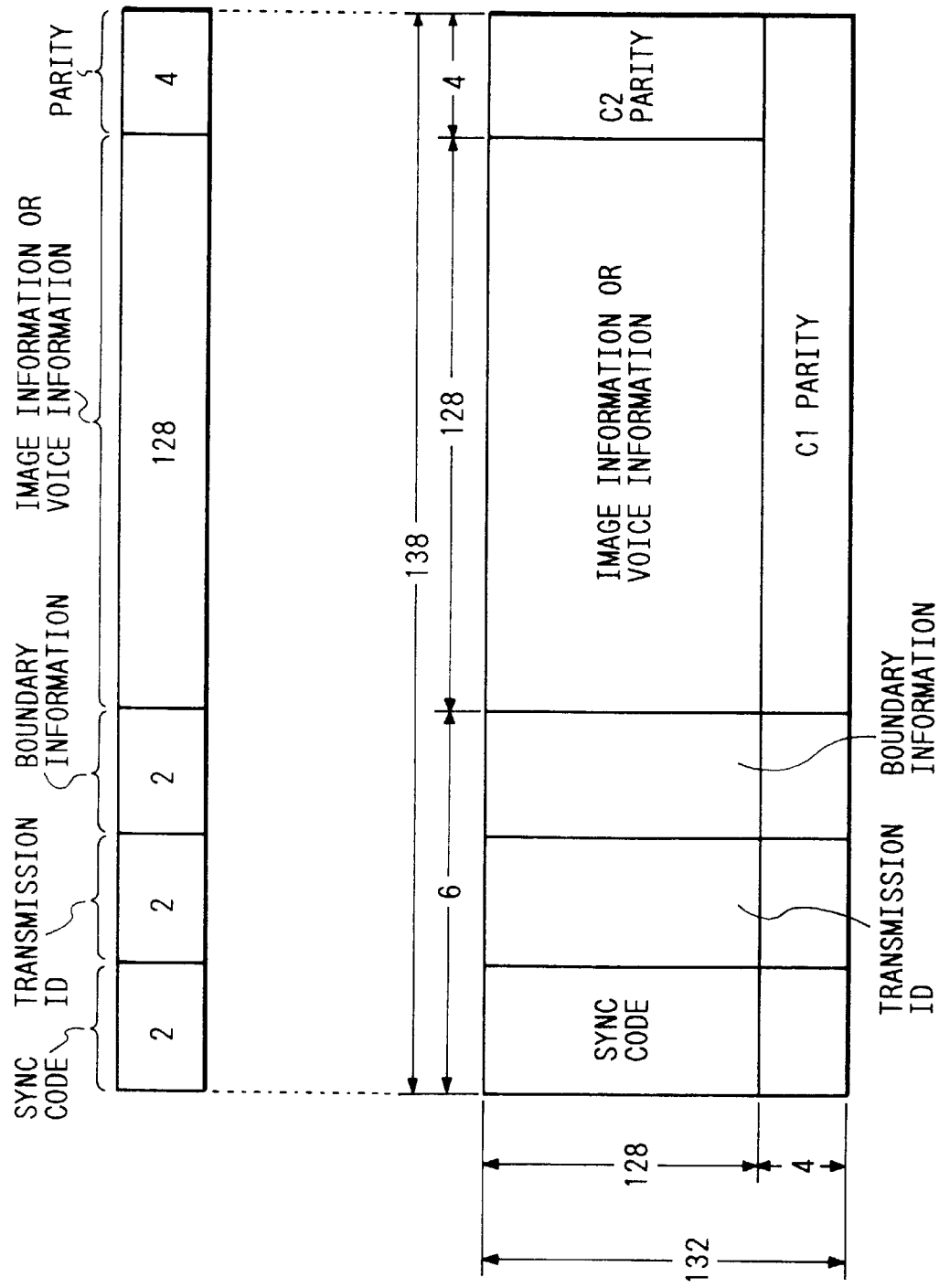

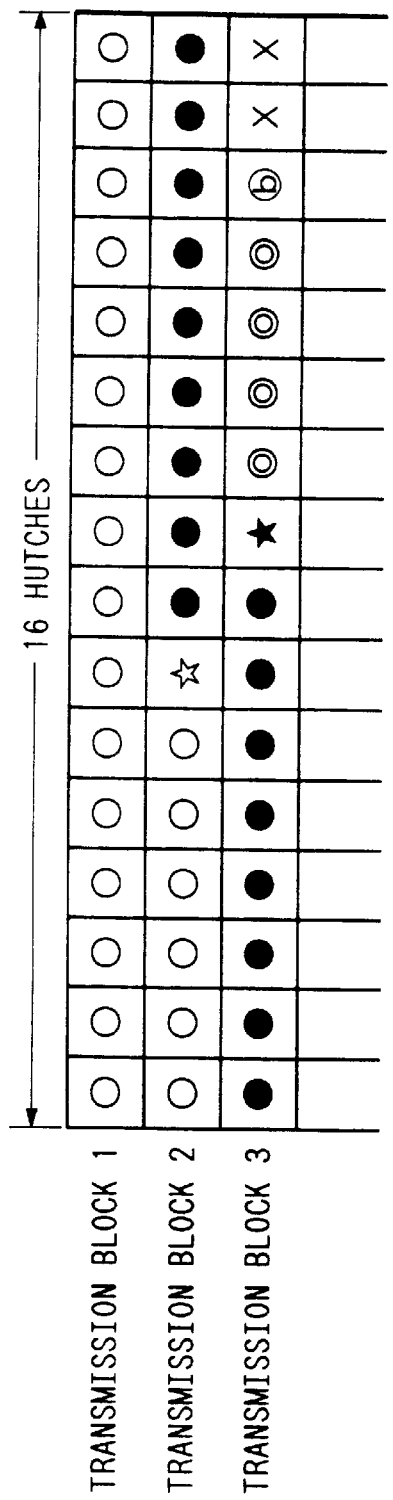

FIG. 6A

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| 1 | 1 | X | X | X | X | X | X | 0 | 0 | 0 | 0 | 0 | 0 | 0 | 0 |

FIG. 6B

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| 1 | 1 | X | X | X | X | X | X | 0 | 0 | 0 | 0 | 0 | 0 | 0 | 1 |

FIG. 6C

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| 1 | 0 | 1 | X | X | X | X | X | 0 | 0 | 0 | 0 | 0 | 0 | 0 | 0 |

FIG. 6D

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| 1 | 0 | 1 | X | X | X | X | X | 0 | 0 | 0 | 0 | 0 | 0 | 0 | 1 |

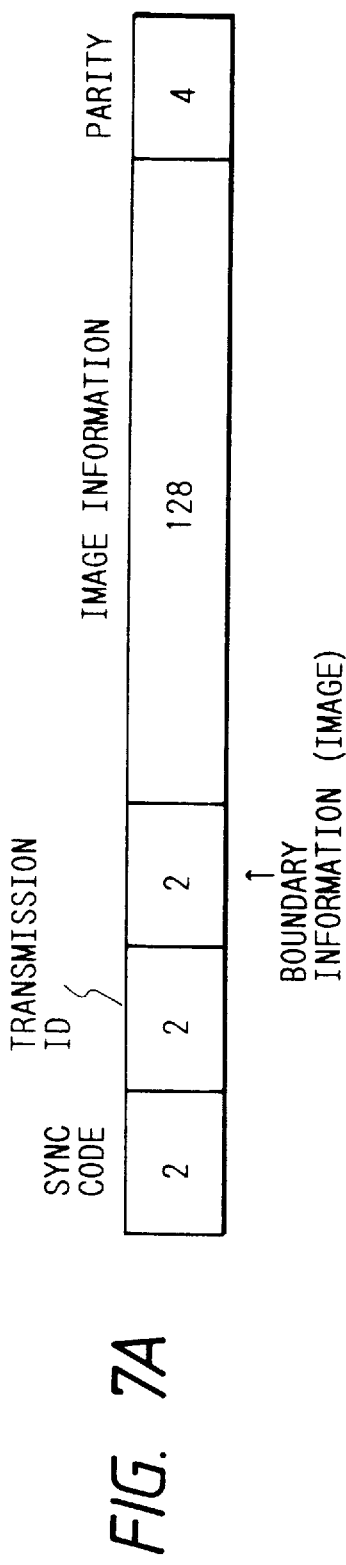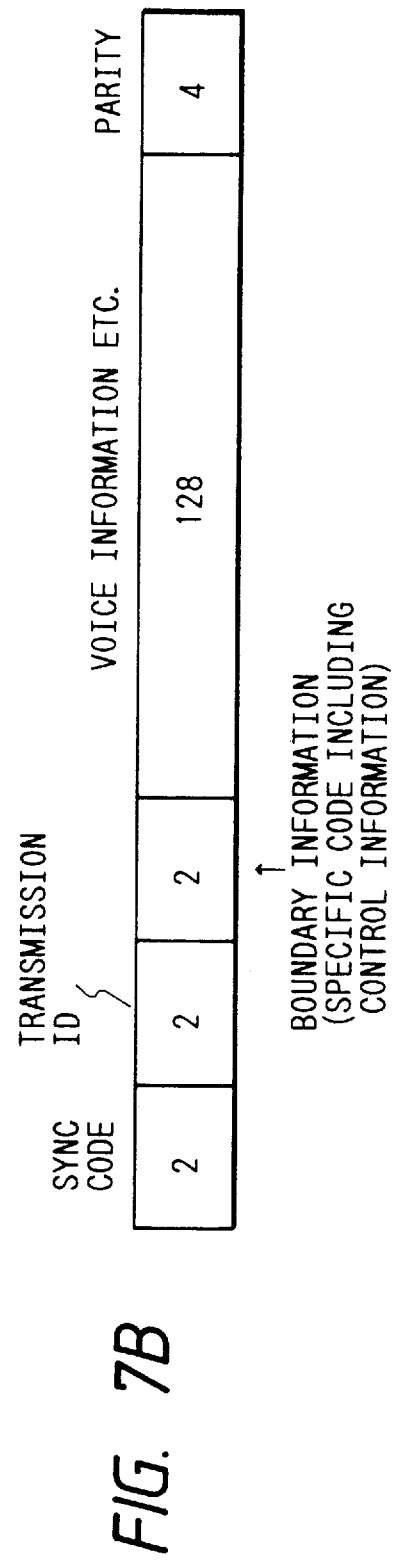
FIG. 7A
FIG. 7B

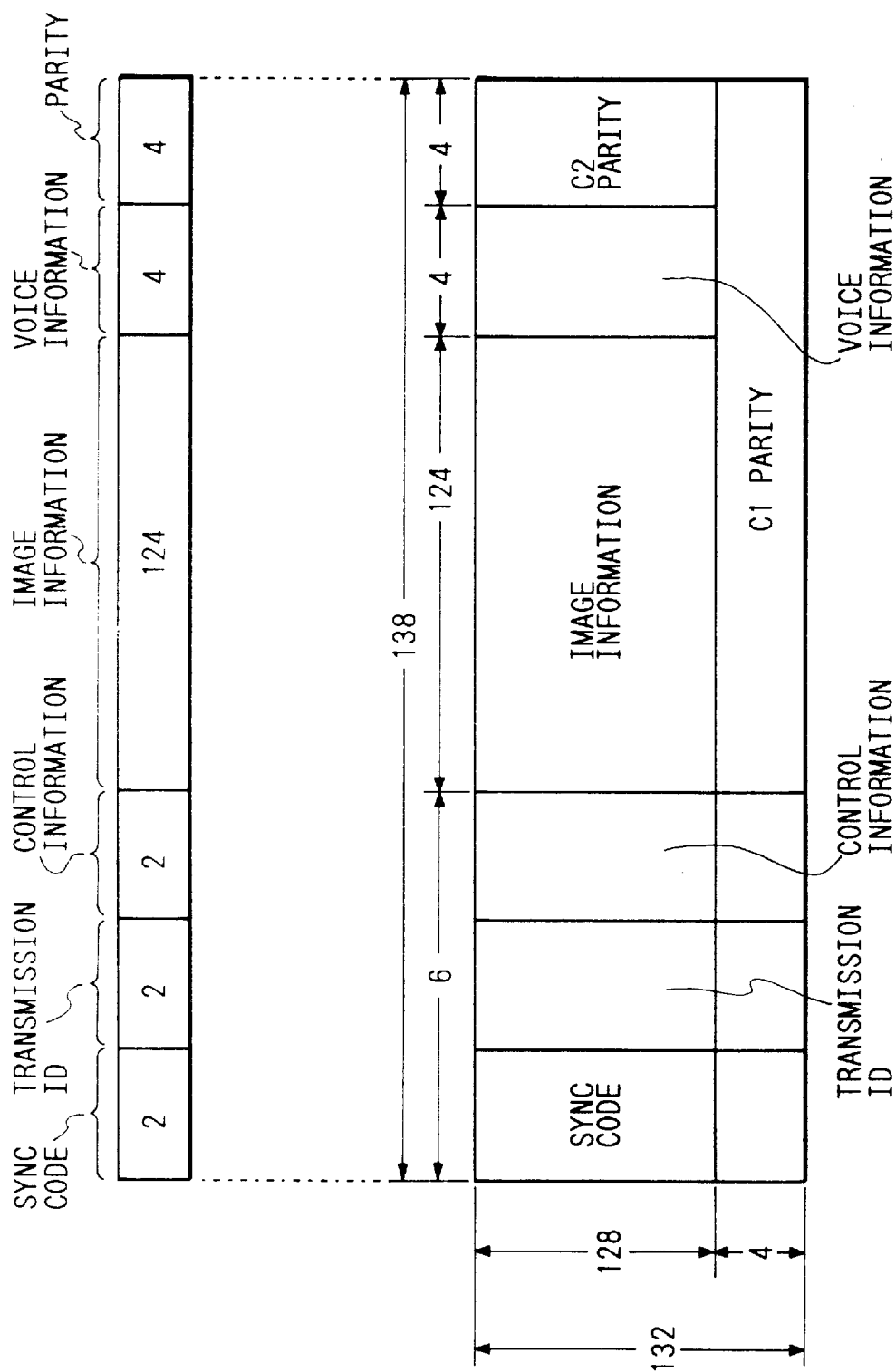

IMAGE TRANSMITTING APPARATUS

This application is a division of application No. 07/962,722 filed Oct. 19, 1992, and now U.S. Pat. No. 5,565,992.

BACKGROUND OF THE INVENTION

1. Field of the Invention

The invention relates to an image transmitting method and, more particularly, to an image transmitting method whereby a variable length coding is performed on image information and the image information which has been variable length coded and is compressed is transmitted together with information other than the image information on a data block unit basis of a predetermined data amount.

2. Related Background Art

In recent years, in the field of digital transmission of a color image, a high efficiency coding technique for information has been advanced and high compression is being realized.

In association with this technique, a good image can be transmitted and received through a transmission line even at a low data rate. On the other hand, however, a degree of influence which is exerted on the image by an error of one word on the transmission line also increases. Therefore, it is necessary to take a countermeasure for a code error on the transmission line by an error detection code and an error correction code, or the like.

Particularly, in the case of using a transmission line in which deterioration of the transmission quality is presumed, as in a magnetic recording medium or a communication satellite or the like, it is particularly necessary to pay an attention to the countermeasure for such code error.

FIG. 8 is a block diagram showing a schematic construction of a conventional image transmitting and receiving system.

In the diagram, reference numeral 101 denotes a terminal to which an image signal is supplied. The image signal supplied from the terminal 101 is converted into a digital signal by an analog/digital (hereinafter referred to as an A/D) converter 102. The digital image signal is coded by a high efficiency coding circuit 103 and an information amount (band) is compressed.

The image information compressed by the coding circuit 103 is supplied to an error correction coding circuit 104. A parity check bit to correct the code error is added (the error correction coding is performed) to the image information and, after that, the image signal is sent to a transmission line 105.

On the reception side, a data train transmitted through the transmission line 105 is first stored into a memory 106. The code error correction using the above parity check bit is executed in an error correction unit 107 which accesses the memory 106. The image information which has been subjected to the code error correction is generated from the memory 106 and supplied to a high efficiency decoding circuit 108. The decoding circuit 108 executes a decoding process opposite to that of the high efficiency coding circuit 103. That is, the decoding circuit 108 expands the information amount (band) and returns to the original digital image signal. The digital image signal is converted into an analog signal by a digital/analog (hereinafter referred to as a D/A) converter 109 and is generated as an analog image signal from a terminal 110.

In FIG. 8, various kinds of constructions of the high efficiency coding circuit 103, namely, various kinds of image compressing methods, have been proposed. As a typical one of the color image coding methods, what is called an ADCT method has been proposed. The ADCT method has been described in detail in Takahiro Saito, et al., "The Coding Method of Still Image", the papers of The Institute of Television Engineers of Japan, Vol. 44, No. 2, (1990), Hiroshi Ochi, et al., "The Tendency of International Standard for Coding a Still Image", the papers 14 of the National Conference of The Institute of Image Electrical Engineers of Japan, 1988, and the like.

FIG. 9 is a block diagram schematically showing a construction of the high efficiency coding circuit of an image using the above ADCT method.

It is now assumed that an image signal which is supplied to a terminal 111 in the diagram is a digital data train which has been converted into eight bits, namely, 256 gradations/color through the A/D converter 102 in FIG. 8. It is also assumed that the number of colors is set to three or four colors such as RGB, YUV, $YP_bP_r$, YMCK, or the like.

The input digital image signal is immediately subjected to a two-dimensional discrete cosine transformation (hereinafter, referred to as a DCT) by a DCT converter 112 on a subblock unit basis of (8×8) pixels.

The DCT converted data (hereinafter, referred to as conversion coefficients) of (8×8) words is quantized by a linear quantization circuit 113. Quantization step sizes are different every conversion coefficient. That is, the quantization step size for each conversion coefficient is set to a value in which (8×8) quantization matrix elements from a quantization matrix generating circuit 114 are multiplied by $2^S$ times by a multiplier 116.

The quantization matrix elements are determined in consideration of the fact that the visibility of quantization noises differs for conversion coefficient of (8×8) words. Table 1 shows an example of the quantization matrix elements.

TABLE 1

| Example of quantization matrix elements | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

The data of $2^S$ is obtained from a data generator 115. S denotes 0 or a positive or negative integer and is called a scaling factor. A picture quality or a data amount is controlled by the value of S.

The DC component in each of the quantized conversion coefficients, that is, the DC conversion coefficient (hereinafter, referred to as a DC component) in the matrix of (8×8) is supplied to a one-dimensional prediction differential circuit 117. A prediction error obtained in the circuit 117 is Huffman coded by a Huffman coding circuit 118. Practically speaking, a quantization output of the prediction error is divided into a plurality of groups. First, the identification number of the group which belongs to the prediction error is Huffman coded and information indicating that the value of the prediction error is the value of that one of the groups is expressed by an equivalent length code.

The conversion coefficient other than the DC component, that is, the AC conversion coefficient (hereinafter referred to as an AC component) is supplied to a zigzag scanning circuit 119. As shown in FIG. 10, the AC conversion coefficients are zigzag scanned by two-dimensional frequencies in the direction from the low frequency component to the high frequency component. A combination of the conversion coefficients (hereinafter referred to as significant coefficients) in which the quantization output is not equal to 0 and the number (run length) of conversion coefficients (hereinafter referred to as insignificant coefficients) in which the quantization output is equal to 0 and which exist between the significant coefficients just before them is generated from the zigzag scanning circuit 119 to a Huffman coding circuit 120.

In the Huffman coding circuit 120, the significant coefficients are classified into a plurality of groups in accordance with the values of the significant coefficients, a combination of the identification number of each group and the run length is Huffman coded, and information indicating that the value of the significant coefficient is a value of that one of the groups is subsequently expressed by an equivalent length code.

Outputs from the Huffman coding circuits 118 and 120 are multiplexed by a multiplexing circuit 121. The multiplexed signal is supplied as a coded output from a terminal 122 to the error correction coding circuit 104 at the post stage.

According to the high efficiency coding as mentioned above, even when the information amount is compressed to a fraction, no deterioration occurs in the image and an extremely high efficiency compression can be executed.

FIG. 11 is a diagram showing a data transmission format according to the conventional system as mentioned above.

In the example shown in the diagram, transmission data has a two-dimensional construction using a double Reed Solomon code which is well known as an error detection and correction code.

A C2 parity of four symbols is added to 124 symbols (hereinafter, one symbol=8 bits) in the lateral direction of the compressed information of the image to be transmitted and four symbols of voice digital information (not shown). A C1 parity of four symbols is also added to 128 symbols in the vertical direction of the image information. Due to this, errors up to two symbols can be corrected with respect to each of the vertical and lateral directions.

On the upper side of FIG. 11, a sync code of two symbols, a transmission ID of two symbols, and control information of two symbols are added to one lateral train, that is, 124 symbols of the image information, four symbols of the voice information, and four symbols of the C2 parity or to 132 symbols of all of the C1 parities. A transmission data block comprising the above symbols as a whole is shown.

One transmitting synchronization (1 ECC block) is constructed by 132 transmission blocks each of which comprises the image information, voice information, C1 parity, C2 parity, sync code, transmission ID, and control information shown on the upper side of FIG. 11. The control information here denotes the foregoing scaling factor, the transmitting method of the voice, the mode information such as stereophonic, bilingual, or the like, the key information for scrambling, the selection information of a receiver, or the like.

However, when the compression of good compression efficiency as mentioned above is executed, that is, when the information is compressed at a high compression ratio and the compressed information is transmitted, the degree of influence which is exerted on the image by one code error is large.

For instance, in the case where the variable length coding as mentioned above has been executed, the subsequent decoding process cannot be performed, so that there is a case where the image after the occurrence of an error fluctuates and enters a state such that it is fairly hard to see.

In the conventional data transmitting format as mentioned above, an amount of image information per unit time changes in dependence on the image. However, an amount of voice information to the image information is always constant. Therefore, the area of the voice information in FIG. 11 must be set so as to have a fairly wide range, so that a long time is expended in vain to transmit the voice information.

Such a problem occurs not only in the voice information but also in the control information. Namely, a time is expended in vain to transmit the control information, so that a transmission capacity of the image information relatively decreases and the picture quality is deteriorated.

SUMMARY OF THE INVENTION

Under the above circumstances, it is an object of the invention to provide an image transmitting method whereby a variable-length coding is executed to image information, and when the variable-length coded image information to be compressed is transmitted together with information other than the image information on a data block unit basis of a predetermined data amount, the image information and the information other than the image information can be efficiently transmitted.

Another object of the invention is to provide an image transmitting method whereby each picture plane is divided into a plurality of regions, a variable-length coding is executed on a region unit basis, and when the variable-length coded image information to be compressed is transmitted together with information other than the image information on a data block unit basis of a predetermined data amount, an influence which is exerted on an image by the generation of a code error on a transmission line is minimized, and the image information and the information other than the image information can be efficiently transmitted.

According to an image transmitting method as an embodiment of the invention, the variable-length coding is executed to the image information, and when the variable-length coded image information to be compressed is transmitted together with the information other than the image information on a data block unit basis of a predetermined data amount, the number of data blocks which mainly include the information other than the image information and don't include the image information to be compressed is made variable for the number of data blocks which mainly include the image information to be compressed.

According to an image transmitting method as another embodiment of the invention, each picture plane is divided into a plurality of regions, the variable-length coding is executed on a region unit basis, and when the variable-length coded image information to be compressed is transmitted on a predetermined data block unit basis, boundary information indicative of the position in the data block at the boundary between the image information to be compressed in each of the divided regions is arranged to a predetermined portion of each of the data blocks and the resultant data block is transmitted, the predetermined portion of each data block includes specific data which can be distinguished from the boundary information, and the information other than the image information is added to the data block including the specific data in place of the image information and the resultant data block is transmitted.

Further, the information other than the image information is added to the predetermined portion including the specific data and the resultant data block is transmitted.

The above and other objects and advantages of the invention will become apparent from the following detailed description taken in conjunction with the accompanying drawings.

BRIEF DESCRIPTION OF THE DRAWINGS

FIG. 3 is a diagram showing a data transmitting format in the system of FIG. 1;

FIG. 5 is a diagram for explaining a transmitting method of variable-length coded image information in the system of FIG. 1;

FIGS. 6A to 6D are diagrams for explaining specific data in the system of FIG. 1;

FIGS. 7A and 7B are diagrams for explaining data blocks in the system of FIG. 1;

FIG. 11 is a diagram showing a state of a zigzag scan in the circuit in the system of FIG. 8.

DETAILED DESCRIPTION OF THE PREFERRED EMBODIMENTS

An embodiment of the invention will be described hereinbelow.

Figure 1:
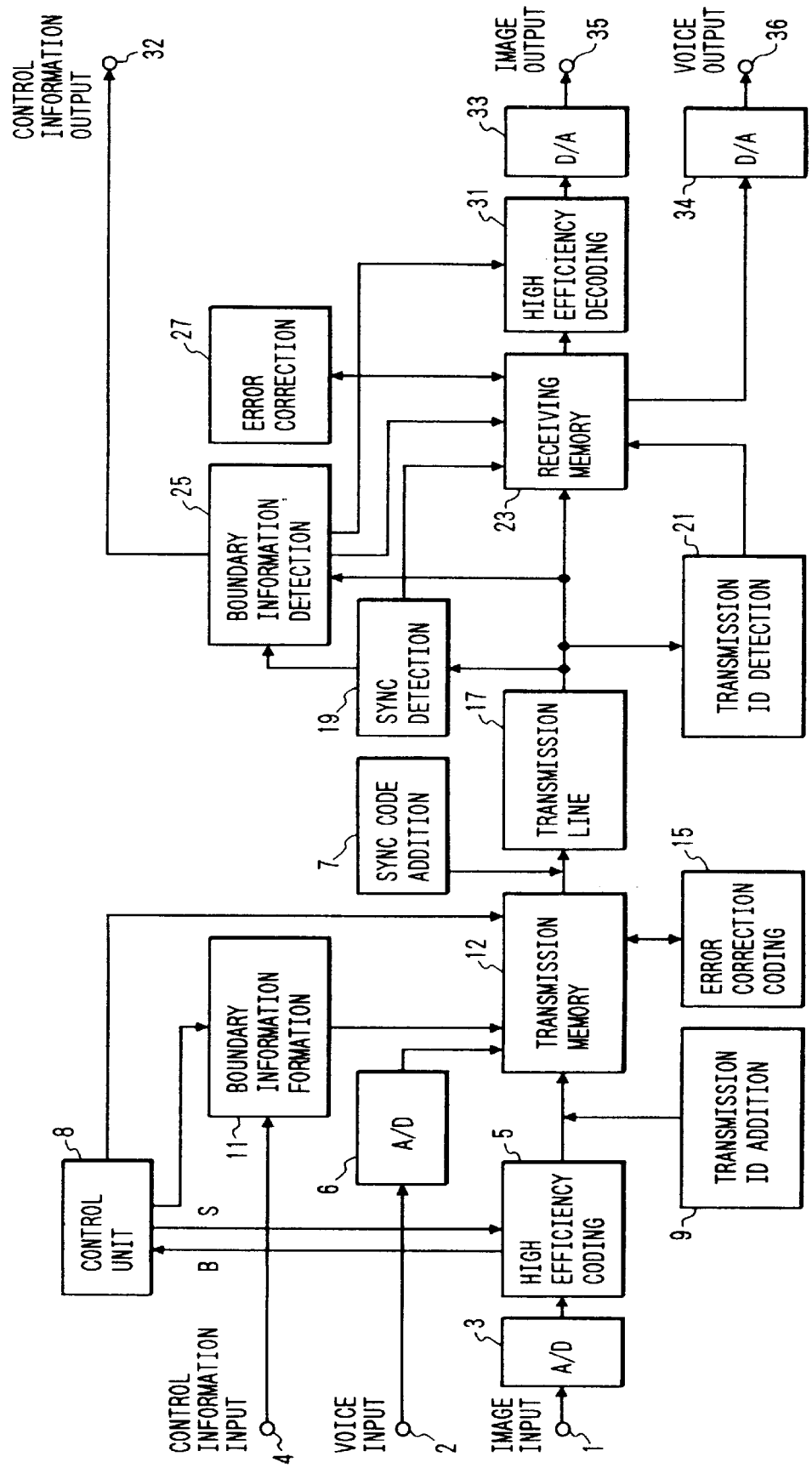
FIG. 1 is a block diagram showing a schematic construction of an image transmission and reception system of an embodiment of an image transmitting method according to the invention.

FIG. 1 is a block diagram showing a schematic construction of an image transmission and reception system according to an embodiment of the invention. The system will now be described hereinbelow with reference to FIG. 1.

Figure 9:
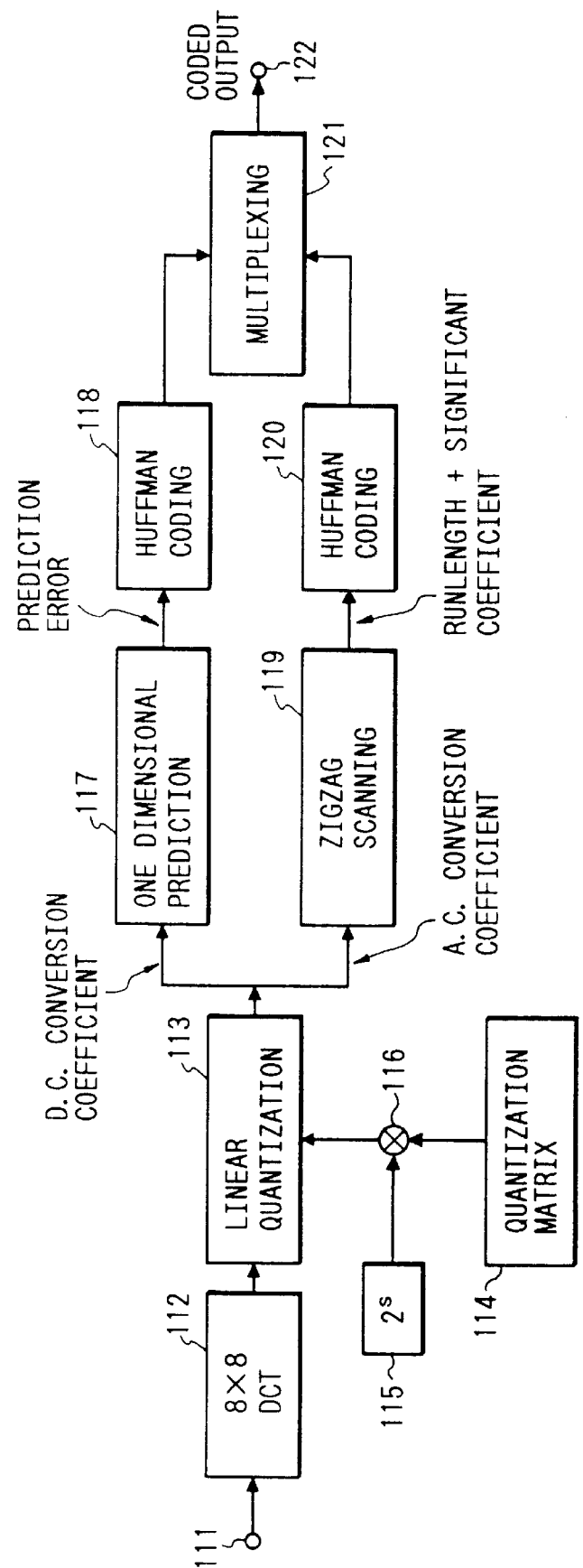
FIG. 9 is a block diagram schematically showing a construction of a high efficient coding circuit of an image using an ADCT method.
Figure 10:
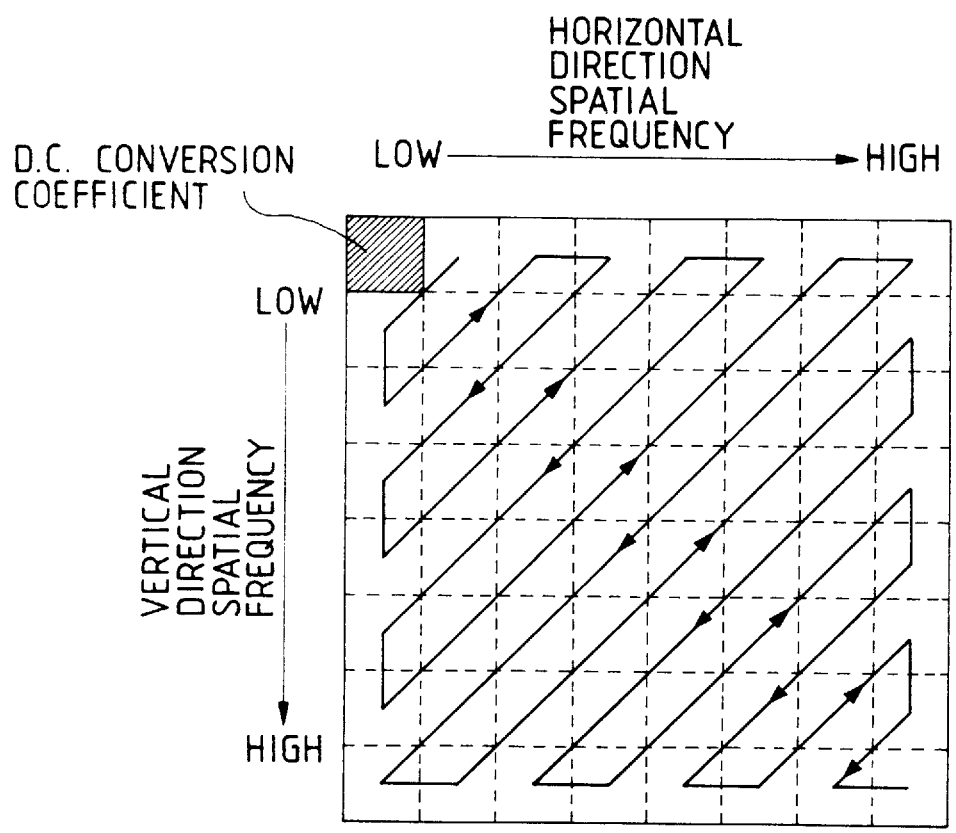
FIG. 10 is a diagram showing a state of a zigzag scan in a zigzag scanning circuit in the system of FIG. 8.

An analog image signal supplied from an image input terminal 1 is converted into a digital signal by an A/D converter 3. The variable-length compression coding as described with reference to FIG. 9 is executed to the digital image signal by a high efficiency coding circuit 5. Additional information (transmission ID) regarding the transmission of the system, for instance, a sync block number is inserted into the compression coded data train by a transmission ID addition circuit 9.

Reference numeral 11 denotes a boundary information formation circuit. The boundary information indicates a boundary of the information (image information which has been variable-length coded) of each region which is obtained by dividing one picture plane into a plurality of regions as will be explained hereinlater.

A control unit 8 gives the scaling factor S to the high efficiency coding circuit 5. The high efficiency coding circuit 5 gives information B indicative of the data amount after completion of the coding by several predetermined scaling factors to the control unit 8. The control unit 8 operates in accordance with the information B indicative of the data amount.

The scaling factor S is determined in a manner such that one frame video signal has a predetermined data amount. Since a method of deciding the scaling factor has been described in detail in the Official Gazettes of Japanese Patent Laid-open Application Nos. 2-408947 and 3-16466 and the like which have already been filed by the same applicant as the present invention and is not directly concerned with the present invention, its detailed description is omitted here.

On the other hand, the analog voice signal supplied from a voice input terminal 2 is converted into a digital signal by an A/D converter 6. The digital signal is supplied to a transmission memory 12 together with the image data from the high efficiency coding circuit 5.

Reference numeral 4 denotes a control information input terminal to receive control information such as transmitting method of a voice, mode information indicative of stereophonic, bilingual, or the like, key information indicative of a rule of an interleave (scramble) of data, selection information of a receiver, and the like. The control information is supplied to the boundary information formation circuit 11.

The information indicative of a data amount of the image information which has been coded by the scaling factor S is also supplied as information B to the control unit 8. The control unit 8 always monitors the relation between the image information amount and the voice information amount and determines whether the relevant synchronous block is allocated to the image information or the voice information on a synchronous block unit basis.

In accordance with the result of the above determination, the boundary information formation circuit 11 generates the foregoing boundary information to the synchronous block allocated to the image information and generates a specific code, which will be explained hereinlater, and the control information from the terminal 4 to the synchronous block allocated to the voice information.

The transmission memory 12 receives the above image information, voice information, control information, boundary information, and the like and generates them in accordance with the order based on a transmitting format as will be explained hereinlater.

An error correction coding circuit 15 executes an error correction coding as will be explained hereinlater to the data stored in the transmission memory 12 and forms and adds a parity check bit.

A sync (synchronous) code is added by a sync code addition circuit 7 to the data train which is generated from the memory 12. After that, the data train with the sync code is transmitted to a transmission line 17.

As for a transmission line 17, a transmission medium such as ground radio wave, optical space, or the like such as optical fiber, satellite, microwave, or the like can be presumed as an immediate transmission line. A recording medium such as tape-shaped medium such as digital VTR, DAT, or the like, disc-shaped medium such as floppy disk, optical disc, or the like, solid-state medium such as a semiconductor memory, or the like can be presumed as an accumulation transmission line.

A transmission rate is set and determined to arbitrary one of various values by the control unit 8 on the basis of the information amount and compression ratio of the original image and a transmitting time which is required. For instance, the transmission rate can be set to various values within a range, for instance, from tens of kilobits/sec to tens of Megabits/sec.

The data train received on the reception side through the transmission line 17 is supplied to a sync code detection circuit 19, by which the foregoing sync code is separated and detected. A transmission ID detection circuit 21 detects the foregoing transmission ID and executes the detection or the like of the attribute of each sync (synchronous) block.

A boundary information detection circuit 25 separates and detects the foregoing boundary information or specific code or control information. A memory 23 stores the data train in accordance with the sync code and transmission ID.

An error correction unit 27 accesses to the memory 23 and corrects a code error to the compression coded image data and the voice information and the like by using the check bit added by the error correction coding circuit 15 mentioned above.

The boundary information detecting circuit 25 discriminates whether the information extracted from a predetermined portion of each sync block of the data train is the boundary information or the control information having the specific code by checking the presence or absence of the specific code. The detection circuit 25 also discriminates whether the relevant sync block is the block for the image information or the block for the voice information.

In accordance with the results of the above discriminations, the image information is generated to a high efficiency decoding circuit 31 every sync block and controls the reading operation of the receiving memory 23 so as to generate the voice information to a D/A converter 34. On the other hand, the control information arranged in a predetermined portion of each sync block is generated from a terminal 32 together with the specific code. The output signal from the terminal 32 is used, for instance, to display a mode or the like.

The boundary information detection circuit 25 further detects the boundary on the compression coded data train of each of the regions obtained by dividing one picture plane from the boundary information. The detected information is supplied to the memory 23 and the high efficiency decoding circuit 31. The decoding circuit 31 reads only the variable-length coded image information in accordance with the boundary information and expands and decodes and supplies the digital image signal which has been returned to the original information amount (band) to a D/A converter 33. Thus, the analog image signal is generated from an output terminal 35. Similarly, the D/A converter 34 converts the voice information into the analog signal and the analog signal is generated from a voice output terminal 36.

The system of the embodiment will now be described in detail hereinbelow with reference to FIGS. 2 to 7.

Figure 2:
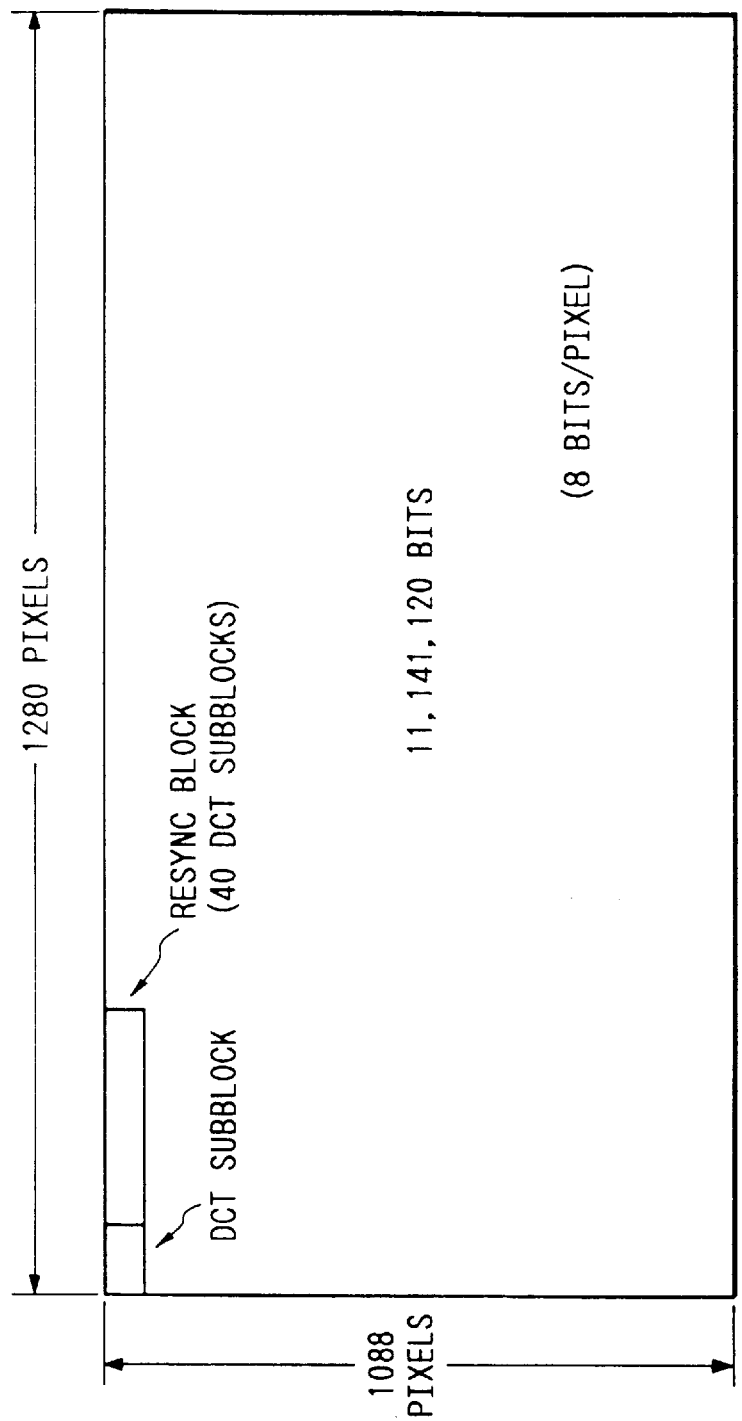
FIG. 2 is a diagram showing information of one picture plane of an image which is transmitted in the system of FIG. 1.

FIG. 2 is a diagram showing the information of one picture plane of an image to be transmitted. One picture plane is sampled by 1280 pixels in the lateral direction and 1088 pixels in the vertical direction. Each pixel is A/D converted by eight bits. A data capacity per picture plane is $$1280 \times 1088 \times 8 = 11,141,120 \text{ bits}$$

In the embodiment, it is assumed that a moving image is transmitted and the data of one picture plane is transmitted every 30 picture planes for one second. Thus, a data capacity per second is $$11,141,120 \times 30 = 334,233,600 \text{ bits/sec}$$

The case where such a moving image information is compression coded into about $\frac{1}{10}$ by the ADCT method which has been described before and the compression coded image information is transmitted will now be presumed.

A DCT subblock is constructed by (8 pixels in the lateral direction)×(8 pixels in the vertical direction) and one resync block is constructed by 40 DCT subblocks as shown in FIG. 2. When one picture plane is divided into regions on a resync block unit basis, total 544 regions of (4 regions in the lateral direction)×(136 regions in the vertical direction) are obtained per picture plane.

The data capacity per resync block is $$40 \times 8 \times 8 \times 8 = 20,480 \text{ bits}$$

FIG. 3 shows a data transmitting format in the system of the embodiment and, particularly, a format of an error correction block (ECC block). A double Reed Solomon code is used as an error correction code for the boundary information and the compression coded image information or voice information.

That is, four symbols of an external code check bit (C2 parity) of the error correction code are added to the boundary information of two symbols and the compression coded image information of 128 symbols or voice information.

Further, with respect to the image information or voice information and the boundary information, four symbols of an inner code check bit ($C_1$ parity) of the double Reed Solomon code are added to 128 symbols in the vertical direction in the diagram.

In this case, an error of up to two symbols can be corrected by the error correction code in each of the vertical and lateral directions. In the upper portion in FIG. 3, the foregoing boundary information of two symbols, sync code of two symbols, and transmission ID of two symbols are added to the symbols of one line in the lateral direction, that is, to 128 symbols of the image information or voice information and four symbols of the C2 parity or to 132 symbols of all of the C1 parities. The transmission sync block (sync block) which is constructed by those symbols in a lump is shown in the upper portion of FIG. 3. One ECC block is constructed by such 132 transmission sync blocks.

Now, assuming that ten ECC blocks are allocated to the transmission image information of one picture plane, the transmission capacity of $$128 \times 128 \times 8 \times 10 = 1,310,720 \text{ bits}$$

is given per picture plane. That is, it will be understood that it is sufficient to compress the data of one picture plane mentioned above to about 11%.

In case of a moving image in which thirty picture planes are transmitted for one second, the transmission capacity of $$1,310,729 \times 30 = 39,321,600 \text{ bits/sec}$$

is given per second. In this instance, the total transmission rate is equal to or larger than $$138 \times 132 \times 8 \times 10 \times 30 = 43,718,400 \text{ bits/sec}$$

The sync code in FIG. 3 is provided to detect the synchronization of the transmission block and has a predetermined fixed pattern. The transmission ID denotes the number of the transmission blocks which are needed to transmit one image. Since such a number is constructed by 16 bits, $2^{16}$ (=about 65000) transmission blocks can be expressed. In case of the embodiment, since there are 1320 (=132×10) transmission blocks, it is sufficient to provide eleven bits.

Figure 4A:
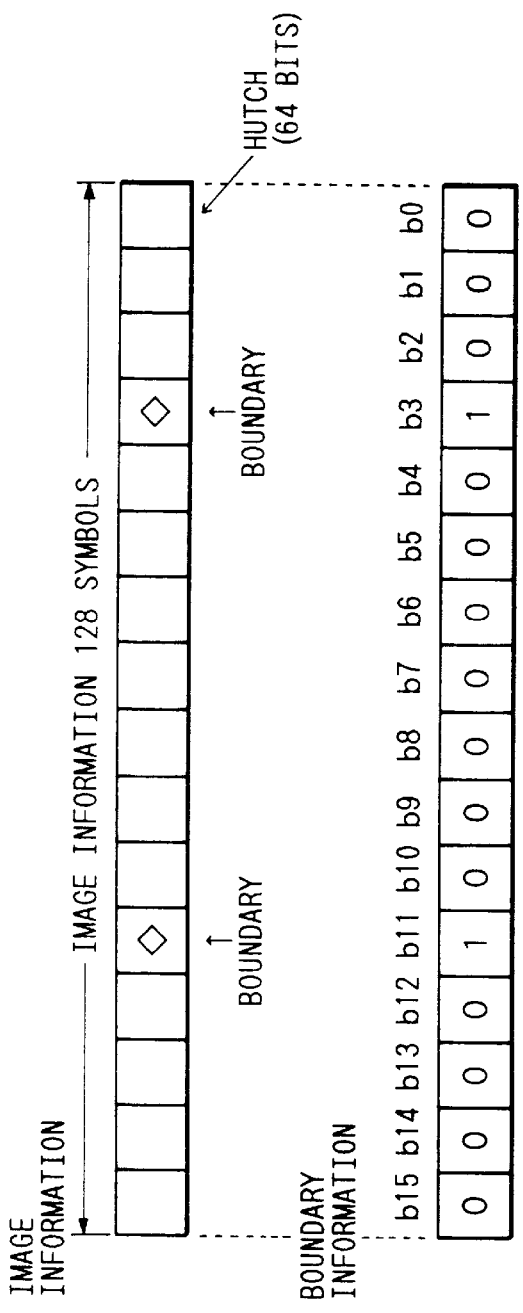
FIGS. 4A and 4B are diagrams each showing the relation between the boundary information and the image information in the system of FIG. 1.
Figure 4B:
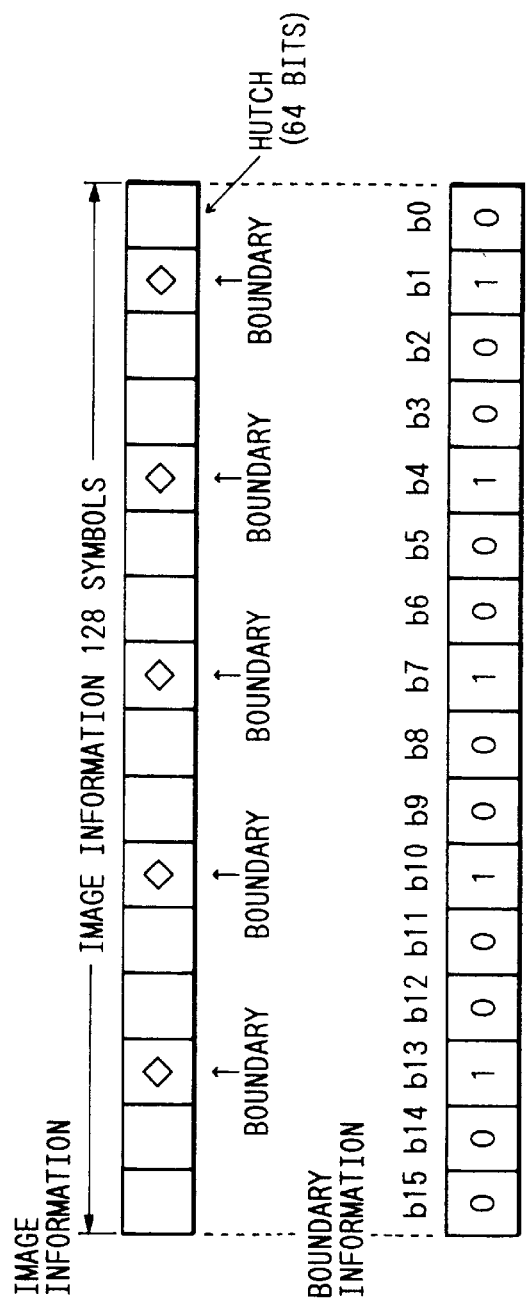
Figure 8:
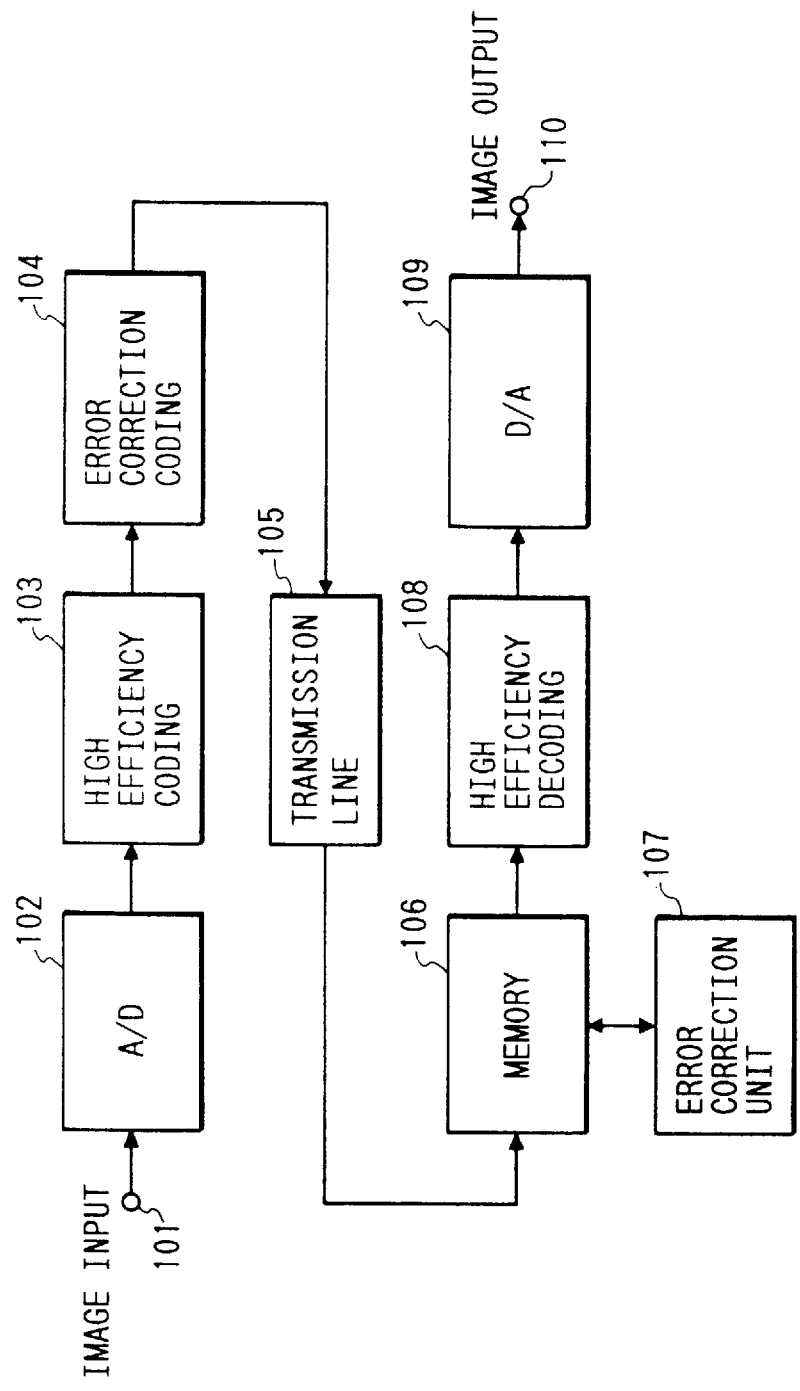
FIG. 8 is a block diagram showing a schematic construction of a conventional image transmission and reception system.

Each of FIGS. 4A and 4B shows the relation between the boundary information in the embodiment and the image information in FIG. 3. The image information region of 128 symbols in FIG. 3 is divided into 16 hatches (small rooms) of every eight symbols, namely, every 64 bits. The boundary information of 16 bits corresponds to those 16 hatches, respectively. As shown in FIG. 4A, when boundaries of the resync blocks of the foregoing transmission target image exist in the fifth and thirteenth hatches from the left edge, bit "1" is set in the corresponding fifth and thirteenth bits from the left edge of the boundary information (the other bits are set to "0"), thereby forming the boundary information.

FIG. 5 is a diagram for explaining a method of transmitting the image information which has been compression variable-length coded.

On the transmission side of the high efficiency coded image information, two symbols (16 bits) of the number (resync number) to indicate the first resync block are first generated to the first resync block and the compression image information is generated from the third symbol.

Explaining further in detail, the DCT conversion is first executed to the first resync block on a subblock unit basis of (8×8) pixels in a manner similar to that described with reference to FIG. 9. After that, the linear quantization of conversion coefficients is executed. The quantization step size differs every conversion coefficient. The quantization step size for each conversion coefficient is set to a value which is obtained by multiplying the (8×8) quantization matrix elements by $2^S$ times in consideration of the difference of each conversion coefficient of the visibility to the quantization noises.

S denotes a scaling factor which is given from the control unit 8 and is set to "0" or a positive or negative integer. The picture quality or an amount of generation data is controlled on a picture plane unit basis by the value of S. S is set to about ⅒. After completion of the quantization, with respect to the DC component, in the first DCT subblock, the one-dimensional prediction is executed between the adjacent subblocks as a differential value from "0". The prediction error is Huffman coded. The quantization output of the prediction error is divided into a plurality of groups. The ID number of the group to which the prediction error belongs is first Huffman coded. Subsequently, the information indicating that the prediction error indicates the value in which one of the groups is expressed by an equivalent length code.

The AC component is coded while zigzag scanning the quantization output in the direction from the low frequency component to the high frequency component. That is, the significant coefficients are classified into a plurality of groups in accordance with the values. A combination of the group ID number and the number of insignificant coefficients sandwiched between the significant conversion coefficients just before the insignificant coefficients is Huffman coded. Subsequently, the information indicating that the prediction error indicates the value in which one of the groups is expressed by an equivalent length code. In a manner similar to the above, the coding process is executed to 40 DCT subblocks and the generated variable length codes are combined to one symbol which is constructed by eight bits and are generated to the image information region of the transmission block. For the hatch including the last bit of the compressed information of one resync block, namely, 40 DCT subblocks, nothing is written into the remaining region in such a hatch (boundary hatch), thereby setting undefined bits. A flag "1" is set to the bit of the boundary information corresponding to the boundary hatch at this time.

For the second resync block, two symbols (16 bits) of the number (resync number) indicative of the second resync block from the beginning of the next hatch of the hatch used in the first resync block are generated and the compression image information is generated from the third symbol.

With respect to the DC component, in the first DCT subblock, the primary prediction is executed between the adjacent subblocks as a differential value from "0" and the prediction error is Huffman coded. The quantization output of the prediction error is divided into a plurality of groups. First, the ID number of the group to which the prediction error belongs is Huffman coded. Subsequently, the information indicating that the prediction error indicates the value in which one of the groups is expressed by an equivalent length code.

The AC component is coded while zigzag scanning the quantization output in the direction from the low frequency component to the high frequency component. The generated variable-length codes are combined to one symbol which is constructed by eight bits and are generated to the image information region of the transmission block. For the hatch including the last bit of the compressed information of 40 DCT subblocks of one resync block, nothing is written into the remaining region in such a hatch, thereby setting undefined bits. A flag "1" is set to the bit of the boundary information corresponding to the boundary hatch at this time.

In a manner similar to the above, the similar processes are successively executed up to the last resync block, thereby high efficiency coding the image data and forming the boundary information.

With reference to FIG. 4B, explanation will now be made with respect to the case where each of the 40 DCT subblocks in one resync block is constructed in a manner such that the Huffman bit length of the DC coefficient is equal to the shortest length of one bit, all of the AC coefficients are insignificant coefficients, a code (EOB) indicative of the end of one DCT subblock from the beginning is set, and the Huffman code length of the EOB is equal to three bits.

In this instance, the information amount of one resync block is (1+3)×40=160 bits Since the data of 160 bits per resync block is generated, in case of the hatch consisting of 64 bits, three hatches are used (160/64=2.5).

Consequently, a distance of three or more bits certainly exists between the flags of the boundary information. The boundary information such that the distance between the flags of the boundary information is equal to 0 or 1 bit is not inherently generated.

In the system of the embodiment, therefore, a specific code which is not inherently generated as the boundary information is allocated to two to three bits from the MSB (most significant bit) of 16 bits of two symbols of the boundary information in FIG. 3, so that the sync block is used as a sync block for the voice information and the voice information of 128 symbols or the like is derived.

In the embodiment, the control information is arranged to eight bits from the LSB (least significant bit) in two symbols in which the specific code has been allocated to two to three bits from the MSB. A practical example will now be described with reference to FIGS. 6A to 6D.

In the case where both of two bits from the MSB of the above two symbols are the specific code of 1, it is assumed that the scaling factor S is shown by eight bits from the LSB. For instance, as shown in FIG. 6A, two bits from the MSB are continuously set to the flag 1 and the subsequent six bits are set to undefined bits and, for instance, the scaling factor 0 is expressed by the subsequent 8-bit code 00000000. On the other hand, as shown in FIG. 6B, two bits from the MSB are continuously set to the flag 1 and the subsequent six bits are set to undefined bits and, for instance, the scaling factor 1 is expressed by subsequent 8-bit code 00000001.

Further, in the case where three bits from the MSB of the above two symbols are equal to "1, 0, 1", it is assumed that the mode of the voice information is shown by eight bits from the LSB. For instance, as shown in FIG. 6C, three bits from the MSB are set to the flags 1, 0, and 1, and the subsequent five bits are set to undefined bits, and for example, the voice mode is set to the stereophonic mode by the subsequent 8-bit code 00000000. On the other hand, as shown in FIG. 6D, three bits from the MSB are set to the flags 1, 0, and 1, and the subsequent five bits are set to undefined bits, and for example, the voice mode is set to the bilingual mode by the subsequent 8-bit code 00000001.

As shown in FIGS. 6A to 6D, the control information such as scaling factor, transmitting method of the voice, mode information such as stereophonic, bilingual, or the like, key information of the scramble, selection information of the receiver, and the like can be given to the boundary information portion including the specific code which cannot be inherently generated. Thus, it is possible to contribute to the improvement of the transmitting efficiency.

By setting various specific codes to a few bits (up to eight bits) from the MSB of two symbols of the boundary information portion, various control information can be transmitted.

FIGS. 7A and 7B are diagrams each showing a sync block (data block) in the system of the embodiment. As shown in FIG. 7A, a boundary information portion indicative of an image block and a sync block (image block) including 128 symbols of the image information exist. As shown in FIG. 7B, a boundary information portion including the specific code and the control information and a sync block (voice block) including 128 symbols of the voice information or the like exist.

In the system of the embodiment, the image block and the voice block are allowed to mixedly exist in the 128 sync blocks in one ECC block shown in FIG. 3 and the ratio of the numbers of image blocks and voice blocks can be varied.

Practically speaking, for a period of time when the voice information of one sync block is stored into the transmission memory 12, the number of image blocks to one voice block, that is, the number of image block between the adjacent voice blocks is determined in accordance with an amount of image information which is generated from the high efficiency coding circuit 5. As mentioned above, such a number is decided by monitoring an amount of image information after completion of the coding by the control unit 8.

By constructing as mentioned above, since the number of image information blocks and the number of voice blocks in one ECC block are determined in accordance with an amount of image information, the voice information can be efficiently transmitted without wasting a time.

On the decoding side, the sync code in the data received from the transmission line 17 in FIG. 1 is first detected by the sync code detection circuit 19. The foregoing transmission ID (transmission block number) is detected by the transmission ID detection circuit 21. The writing timing of the memory 23 is controlled by the sync code and the transmission data is stored into the address according to the transmission block number. The capacity of the receiving memory 23 is set to a value which is equal to or larger than the information amount of the transmission data of one picture plane.

As mentioned above, in the error correction unit 27, an error of the voice information or the compressed image information is corrected.

When the first resync block stored in the memory 23 is read out, since the two head symbols of the first hatch denote the resync number, the information is supplied from the third symbol of the first hatch to the high efficiency decoding circuit 31 at the post stage. When the last hatch of the first resync block is detected by the boundary information detected by the boundary information detection circuit 25, the information is supplied to the high efficiency decoding circuit 31 from the third symbol of the next hatch, namely, the first hatch of the second resync block.

Since the scaling factor has been multiplexed to the boundary information portion of the voice block as mentioned above, it is detected by the boundary information detection circuit 25 and is sent to the high efficiency decoding circuit 31. Another control information such as information indicative of the voice transmitting mode mentioned above or the like is generated from the detection circuit 25 to the terminal 32.

In this instance, with respect to the first resync block, since it relates to the first information, the information is sent to the high efficiency decoding circuit 31 at the post stage from the third symbol next to the first two symbols (resync number) in the image information from the memory 23. Subsequently, as for the second resync block, the last hatch of the first resync block is detected by the boundary information detection circuit 25 according to the invention. The information is sent to the decoding unit from the third symbol of the next hatch. The above operations are similarly executed with respect to the third and subsequent resync blocks.

It is now presumed the case where an error generation ratio of the transmission line temporarily extremely increases, the generation frequency of the code error exceeds the capability of the error correction unit 27, the error correction continuously becomes disable, an erroneous correction or the like occurs, and the boundary information is also broken.

Even in such a case, according to the above embodiment, at a time point when the quality of the transmission line is recovered and the error generation ratio lies within the error correctable range, new boundary information is detected and the resync number existing in the first two symbols of the next hatch of the hatch corresponding to the bit in which the boundary flag has been set to "1" can be detected. That is, the image information can be reconstructed in a normal state from the resync block in which the resync number has been detected.

Namely, even when there is a temporary deterioration of the transmission line, the perfect image can be immediately reproduced.

In the system of the embodiment as mentioned above, even when an amount of image information is not decided, the voice information can be transmitted without a vain. Moreover, with regard to the image sync block, since the boundary information is transmitted, the picture quality is not largely deteriorated upon decoding.

The invention is not applied to only the coding apparatus of the system like the embodiment as mentioned above but a large effect is obtained when the invention is applied to an apparatus such that the variable-length coding is performed to the image signal which is generally transmitted.

For instance, even in the case where an image is previously separated to a luminance signal and color difference signals and a block is constructed with respect to each of the luminance signal and the color difference signals, processes similar to those mentioned above can be performed.

In the embodiment, although the invention has been described with respect to the image transmission and reception system having the error detection and correction units, the invention can be also obviously easily applied to an image transmission and reception system having no error detection and correction unit which is used in a transmission line such as an optical fiber in which an error is hardly mixed. The image information is not limited to any of the moving image, semi-moving image, and still image. The number of bits of the boundary information, the number of hatches, the method of dividing the hatches, the definition names, and the like are also not limited to those mentioned above.

Further, the method of giving the specific code in the embodiment, the kind of control information which is transmitted by the specific code, and the like have been mentioned as a mere example for convenience of explanation of the invention.

As will be obviously understood from the above description, according to the image transmitting method of the invention, even when an amount of image information per unit time is changed, the information such as voice information or the like other than the image information can be also efficiently transmitted by the variable-length coding and the deterioration of the picture quality due to a decrease in amount of information which is transmitted as image information can be minimized. A large deterioration in image with respect to the image information through an inferior transmission line can be suppressed without adding a large redundancy to the image information. Even the information such as voice information or the like other than the image information can be efficiently transmitted by using the existence of the boundary information.

The invention can be embodied by many modifications and variations without departing from the spirit and main features of the present invention.

In other words, the foregoing description of the embodiments has been given for illustrative purposes and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus, comprising:
   input means for inputting variable-length encoded image information and fixed-length encoded audio information;
   forming means for forming synchronization blocks of the image information and synchronization blocks of the audio information on a unit basis of a predetermined data amount, respectively;
   transmission means for transmitting the synchronization blocks formed by said forming means; and
   control means for selectively changing a number of the synchronization blocks of the image information and a number of the synchronization blocks of the audio information to be transmitted in a predetermined amount of time by said transmission means.

2. An apparatus according to claim 1, wherein said forming means adds to each synchronization block discrimination information which discriminates whether that synchronization block contains audio information or image information.

3. An apparatus according to claim 1, wherein the inputted image information is information which is block encoded.

4. An apparatus according to claim 1, wherein the inputted image information is information which is encoded by using a discrete cosine transform.

5. An apparatus according to claim 1, further comprising detection means for detecting a data amount of the variable-length encoded image information, and wherein the number of the synchronization blocks of the image information relative to the number of the synchronization blocks of the audio information is changed by said transmission means according to the data amount detected by said detection means.

6. An image processing apparatus, comprising:
   division means for dividing input image information into blocks;
   encoding means for variable-length encoding the blocks divided by said division means on a unit basis of one block; and
   forming means for forming synchronization blocks from data encoded by said encoding means on a unit basis of a predetermined data amount, said forming means providing in each synchronization block a predetermined area for storing boundary information indicating a position of a boundary between the image information of each block divided by said division means, and said forming means storing data other than the boundary information in said predetermined area.

7. An apparatus according to claim 6, wherein said data other than the boundary information is specific data which is distinguishable from the boundary information.

8. An apparatus according to claim 7, further comprising input means for inputting audio information, and wherein synchronization blocks are formed from the inputted audio information when said specific data is stored in said predetermined area.

9. An apparatus according to claim 7, wherein said forming means stores quantization step information used by said encoding means in said predetermined area in addition to said boundary information.

10. An image processing apparatus, comprising:
    input means for inputting synchronization blocks, the input synchronization blocks including first synchronization blocks of encoded image data and second synchronization blocks of encoded audio data, each of the first and second synchronization blocks having been formed on a unit basis of a predetermined data amount, respectively,
    said input means inputting a first number of the first synchronization blocks and a second number of the second synchronization blocks per predetermined time period, wherein the first number and the second number are changeable from predetermined time period to predetermined time period; and
    decoding means for decoding the encoded image data in the input first synchronization blocks and the encoded audio data in the input second synchronization blocks.

11. An apparatus according to claim 10, wherein each of the input synchronization blocks includes discrimination data which indicates whether the respective synchronization block contains image data or audio data.

12. An image processing method, comprising the steps of:

inputting variable-length encoded image information and fixed-length encoded audio information;

forming synchronization blocks of the image information and synchronization blocks of the audio information on a unit basis of a predetermined data amount, respectively;

transmitting the synchronization blocks formed in said forming step; and selectively changing a number of the synchronization blocks of the image information and a number of the synchronization blocks of the audio information to be transmitted in a predetermined amount of time by said transmitting step.

13. An image processing method, comprising the steps of:

dividing input image information into blocks;

variable-length encoding the blocks divided at said dividing step on a unit basis of one block;

forming synchronization blocks from data encoded at said encoding step on a unit basis of a predetermined amount of data, said forming step providing in each synchronization block a predetermined area for storing boundary information indicating a position of a boundary between the image information of each block divided in said dividing step, and said forming step storing data other than the boundary information in the predetermined area.

14. An image processing method, comprising the steps of:

inputting synchronization blocks, the input synchronization blocks including first synchronization blocks of encoded image data and second synchronization blocks of encoded audio data, each of the first and second synchronization blocks having been formed on a unit basis of a predetermined data amount, respectively, said input step inputting a first number of the first synchronization blocks and a second number of the second synchronization blocks per predetermined time period, wherein the first number and the second number are changeable from predetermined time period to predetermined time period; and decoding the encoded image data in the input first synchronization blocks and the encoded audio data in the input second synchronization blocks.

* * * * *